(12) United States Patent
Takeda

(10) Patent No.: US 8,970,531 B2
(45) Date of Patent: Mar. 3, 2015

(54) TACTILE SENSATION PROVIDING APPARATUS

(75) Inventor: Jun Takeda, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 179 days.

(21) Appl. No.: 13/818,949

(22) PCT Filed: Jul. 27, 2011

(86) PCT No.: PCT/JP2011/004253

§ 371 (c)(1),
(2), (4) Date: Feb. 25, 2013

(87) PCT Pub. No.: WO2012/026066

PCT Pub. Date: Mar. 1, 2012

(65) Prior Publication Data

US 2013/0154986 A1   Jun. 20, 2013

(30) Foreign Application Priority Data

Aug. 23, 2010 (JP) ................... 2010-186131

(51) Int. Cl.
*G06F 3/041* (2006.01)
*G06F 3/01* (2006.01)
*G06F 3/0488* (2013.01)

(52) U.S. Cl.
CPC ............ *G06F 3/016* (2013.01); *G06F 3/04883* (2013.01)
USPC ............................ 345/173; 345/156; 715/702

(58) Field of Classification Search
CPC ......... G06F 3/016; G06F 3/044; G06F 3/041; G06F 3/0488; G06F 3/04886; G06F 2203/014
USPC .......................... 345/156, 168, 169, 173, 174; 178/18.01, 18.03; 715/701, 702
See application file for complete search history.

(56) References Cited

U.S. PATENT DOCUMENTS

| 7,639,239 B2 | 12/2009 | Kajimoto et al. |
| 7,952,566 B2 | 5/2011 | Poupyrev et al. |
| 2011/0095986 A1 | 4/2011 | Aono et al. |
| 2011/0279381 A1 * | 11/2011 | Tong et al. ............ 345/173 |

FOREIGN PATENT DOCUMENTS

| JP | 2002-229716 A | 8/2002 |
| JP | 2006-155447 A | 6/2006 |
| JP | 2006-163748 A | 6/2006 |
| JP | 2008-033739 A | 2/2008 |
| WO | 2009/022657 A1 | 2/2009 |

OTHER PUBLICATIONS

International Search Report; PCT/JP2011/004253; Sep. 13, 2011.

* cited by examiner

*Primary Examiner* — Regina Liang
(74) *Attorney, Agent, or Firm* — Studebaker & Brackett PC

(57) ABSTRACT

A tactile sensation providing apparatus determines a touched object and stores touch information based on the object in a memory unit 16. When an object in current touch information does not match an object in previous touch information stored in the memory unit 16, the tactile sensation providing unit 12 provides a first tactile sensation. When these objects match each other, the tactile sensation providing unit 12, based on the current touch information and the previous touch information, provides the first tactile sensation or a second tactile sensation, which is different from the first tactile sensation and provided with lower power than that for providing the first tactile sensation.

3 Claims, 8 Drawing Sheets

| TACTILE SENSATION | I | II | II | II | II | I | II |
|---|---|---|---|---|---|---|---|
| THE NUMBER OF TOUCHES | 1 | 2 | 3 | 4 | 5 | 6→1 | 2 |
| CHAEACTER | KA | KI | KU | KE | KO | KA | KI ・・・ |

| TACTILE SENSATION | I | II | II | II | II | II | I | II |
|---|---|---|---|---|---|---|---|---|
| THE NUMBER OF TOUCHES | 1 | 2 | 3 | 4 | 5 | 6 | 7→1 | 2 |
| CHAEACTER | YA | YU | YO | ya | yu | yo | YA | YU ・・・ |

| TACTILE SENSATION | I | II | II | II | II | II | II | I | II |
|---|---|---|---|---|---|---|---|---|---|
| THE NUMBER OF TOUCHES | 1 | 2 | 3 | 4 | 5 | 6 | 7 | 8→1 | 2 |
| CHAEACTER | J | K | L | j | k | l | 5 | J | K | ... |

| TACTILE SENSATION | I | II | II | II | II | II | II | II | I | II |
|---|---|---|---|---|---|---|---|---|---|---|
| THE NUMBER OF TOUCHES | 1 | 2 | 3 | 4 | 5 | 6 | 7 | 8 | 9 | 10→1 | 2 |
| CHAEACTER | W | X | Y | Z | w | x | y | z | 9 | W | X | ... |

TACTILE SENSATION PROVIDING APPARATUS

CROSS REFERENCE TO RELATED APPLICATION

This application claims priority to and the benefit of Japanese Patent Application No. 2010-186131 filed on Aug. 23, 2010, the entire contents of which are incorporated herein by reference.

TECHNICAL FIELD

The present invention relates to a tactile sensation providing apparatus.

BACKGROUND ART

In recent years, a touch panel as an input apparatus such as an operation unit for receiving an input operation by an operator has been popularly used for mobile terminals such as mobile phones and gaming machines; information equipments such as calculators and ticket vending machines; home electric appliances such as microwaves, TV sets, lighting equipments; industrial equipment (FA equipment) and the like. Generally, the touch panel is constituted by using a touch sensor disposed on a display unit such as an LCD (Liquid Crystal Display) panel or an EL (Electroluminescence Display) panel.

There are known a variety of types of the touch sensor, such as a resistive film type, a capacitive type, an optical type and the like. However, touch sensors of these types receive a touch input (the input operation) by a touch object such as a finger or a stylus pen and, unlike push-button switches, the touch sensors themselves are not physically displaced when being touched. Since the operator may not obtain feedback to the input when the touch input is received, the operator may not obtain sufficient operability and may feel stressful.

As such, there are suggested a number of techniques to improve the operability by, for example, adding a function to provide feedback to the operator through vibration and the like upon input to the touch sensor and notifying the operator that the input operation is received. For example, there are known techniques that, by changing a pattern of a tactile sensation provided to the operator as feedback based on a position and a pressure on the touch sensor touched, touching duration and the like, increases an information quantity obtained by the operator through tactile sensations in response to an operation and thus further improves the operability (for example, see Patent Documents 1, 2).

RELATED ART DOCUMENTS

Patent Documents

Patent Document 1: Japanese Patent Laid-Open No. 2006-155447
Patent Document 2: Japanese Patent Laid-Open No. 2008-033739

SUMMARY OF INVENTION

Technical Problem

Incidentally, in order to provide feedback upon reception of the input to the touch sensor, it is necessary to generate vibration and the like by an electric device. For example, when a character is input by a multi-tap method, operation images 111, 112 illustrated in FIG. 9 and FIG. 10, for example, are displayed on a display unit 110. The operation image 111 illustrated in FIG. 9 is used for a Japanese "Kana" input and displays a plurality of predetermined keys (objects) of dial keys having rows of Japanese "Kana" assigned thereto. In this case, every time the input is received as each of the keys having the row assigned thereto is pushed or pressed, "Kana" characters corresponding to the row are displayed in order. For example, every time a key of a "Ka" row receives the input, characters "Ka", "Ki", "Ku", "Ke", and "Ko" in the "Ka" row are displayed in order.

The operation image 112 illustrated in FIG. 10 is used for an English language input in English-speaking countries and the like and displays a plurality of predetermined keys (objects) of dial keys having 3 or 4 alphabets or a symbol assigned thereto. In this case, every time the input is received as each of the keys is pushed or pressed, the alphabets and the like assigned thereto are switched in order. For example, alphabets "A, B and C" are assigned to a "2" key and, every time an input to the key is received, uppercase alphabets, lowercase alphabets and a number, that is "A", "B", "C", "a", "b", "c", and "2" are switched in order.

When similar feedback is provided every time the input to the object is received as described with reference to FIG. 9 and FIG. 10, power consumption increases. Therefore, for the mobile terminal, there is a concern over shortening a battery life in comparison to a mode providing no feedback. However, neither Patent Document 1 nor Patent Document 2 described above considers such power consumption.

Accordingly, an object of the present invention, in consideration of such a condition, is to provide a tactile sensation providing apparatus capable of efficiently reducing power consumption without compromising operability of the input operation.

Solution to Problem

In order to achieve the above object, a tactile sensation providing apparatus according to a first aspect of the present invention includes:

a display image generation unit configured to generate display image information including operation image information having a plurality of objects;

a display unit configured to display a display image by inputting the display image information;

a touch sensor disposed on the display unit and configured to detect a touch position and to output touch position information;

a tactile sensation providing unit configured to vibrate a touch face of the touch sensor;

a memory unit configured to store information about the objects; and a tactile sensation control unit configured to control provision of a tactile sensation by the tactile sensation providing unit, wherein the tactile sensation control unit determines the object based on the operation image information and the touch position information and stores touch information indicating a circumstance of generation of the touch position information including the information about the object, when an object in current touch information to be newly stored in the memory unit does not match an object in previous touch information stored in the memory unit before the current touch information, the tactile sensation control unit controls the tactile sensation providing unit such that a first tactile sensation is provided to a touch object touching the touch face, and when the object in the current touch information matches the object in the previous touch information, the tactile sensation control unit controls the tactile sensation providing unit such that the first tactile sensation or a second tactile sensation, provided with power lower than power for providing the first tactile sensation, is provided to the touch object.

A second aspect of the present invention is the tactile sensation providing apparatus according to the first aspect, wherein the tactile sensation control unit measures a touching time to input the touch position information, includes the touching time in the touch information and stores the touch information in the memory unit, and when the object in the current touch information matches the object in the previous touch information and a predetermined time has passed at the touching time in the current touch information after the touching time in the previous touch information, the tactile sensation control unit controls the tactile sensation providing unit such that the first tactile sensation is provided to the touch object.

A third aspect of the present invention is the tactile sensation providing apparatus according to the first aspect, wherein the memory unit further stores a predetermined value of the number of sequential touches for each of the plurality of objects, the tactile sensation control unit counts the number of sequential touches when the object in the current touch information matches the object in the previous touch information, includes the counted number in the touch information and stores the touch information in the memory unit, and when the object in the current touch information matches the object in the previous touch information and the counted number of the sequential touches in the current touch information matches the predetermined value of a corresponding object stored in the memory unit, the tactile sensation control unit controls the tactile sensation providing unit such that the first tactile sensation is provided to the touch object.

Effect of the Invention

According to the present invention, since the first tactile sensation and the second tactile sensation, which may be substantialized by power lower than that for the first tactile sensation, are selectively provided, power consumption may be efficiently reduced without compromising operability of an input operation.

DESCRIPTION OF EMBODIMENT

An embodiment of the present invention will be described with reference to the accompanying drawings.

Figure 1:
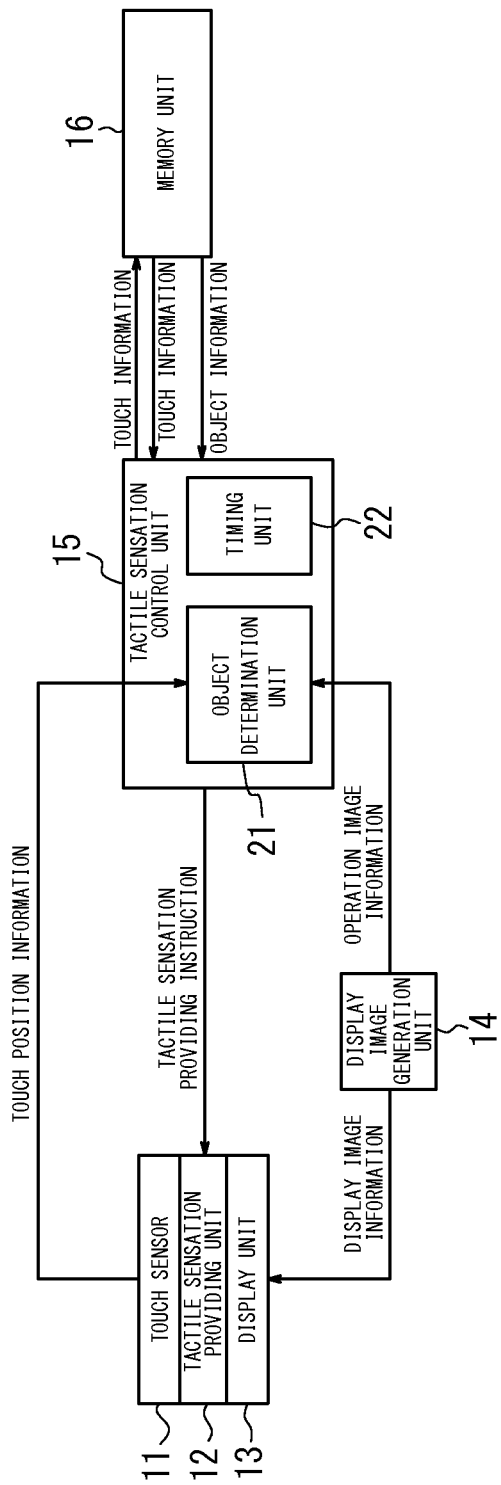
FIG. 1 is a functional block diagram illustrating a configuration of a main part of a tactile sensation providing apparatus according to one embodiment of the present invention.

FIG. 1 is a functional block diagram illustrating a configuration of a main part of a tactile sensation providing apparatus according to one embodiment of the present invention. The tactile sensation providing apparatus includes a touch sensor 11, a tactile sensation providing unit 12, a display unit 13, a display image generation unit 14, a tactile sensation control unit 15 and a memory unit 16. The touch sensor 11 receives a touch input to the display unit 13 by a touch object such as a finger and the like and is constituted by using, for example, a touch panel or a touch switch of a known type such as a resistive film type, a capacitive type, an optical type and the like. Touch position information of the touch object such as the finger or a stylus pen detected by the touch sensor 11 is supplied to the tactile sensation control unit 15. Note that a touch operation by the touch object includes, depending on the type of the touch sensor, pushing or pressing the touch object against the touch sensor.

The tactile sensation providing unit 12 vibrates a touch face of the touch sensor 11 under control of the tactile sensation control unit 15 and is constituted by using a known vibration means such as, for example, a piezoelectric element and an eccentric motor. For example, the tactile sensation providing unit 12 may have a configuration disclosed in Japanese Patent Laid-Open No. 2010-146507 by the present applicant.

The display unit 13 is constituted by using, for example, a liquid crystal display panel, an organic EL display panel or the like. The display image generation unit 14 generates display image information including operation image information having a plurality of objects based on application and OS (Operating System). The display image information is supplied to the display unit 13 such that the display unit 13 displays a display image including an operation image having a plurality of objects of input keys such as, for example, push-button switches (push-type button switches). The operation image information is supplied to the tactile sensation control unit 15.

The tactile sensation control unit 15 controls the tactile sensation providing unit 12 and includes an object determination unit 21 and a timing unit 22. The object determination unit 21, based on the touch position information from the touch sensor 11 and the operation image information from the display image generation unit 14, determines a touched object. The timing unit 22 times when the object is touched. The object (an ID number) determined by the object determination unit 21 and a touching time timed by the timing unit 22 are stored in the memory unit 16 as touch information. The tactile sensation control unit 15 may be constituted by using software executed by any suitable processor such as CPU (Central Processing Unit) or DSP (Digital Signal Processor).

Figure 9:
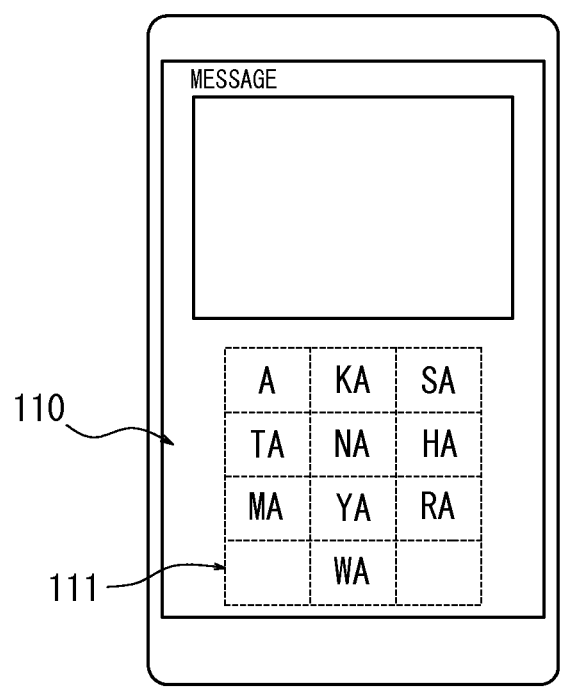
FIG. 9 is a diagram illustrating an example of an operation image for a Japanese "Kana" input.

The memory unit 16 stores the touch information including the touched object, the touching time and the number of successive touches obtained from the tactile sensation control unit 15 and the object information including a predetermined value of the number of successive touches for each of the objects. The memory unit 16 may be constituted by using an internal memory of the tactile sensation control unit 15. Here, the predetermined value of the number of successive touches for each of the objects included in the object information represents, for a character input, for example, the number of touches to display a first character (character that appears first) in a string assigned to the object for the second time, depending on an input mode. For example, for a Japanese "Kana" input by a multi-tap method of the operation image 111 illustrated in FIG. 9, a first character "Sa" is displayed by a first touch and then by a sixth touch to the "Sa" row key (object). In this case, accordingly, a predetermined value "6" is stored.

Then, the tactile sensation control unit 15, based on the touch position information from the touch sensor 11, the operation image information from the display image generation unit 14, and the touch information and the object information stored in the memory unit 16, controls an operation of the tactile sensation providing unit 12.

Figure 2:
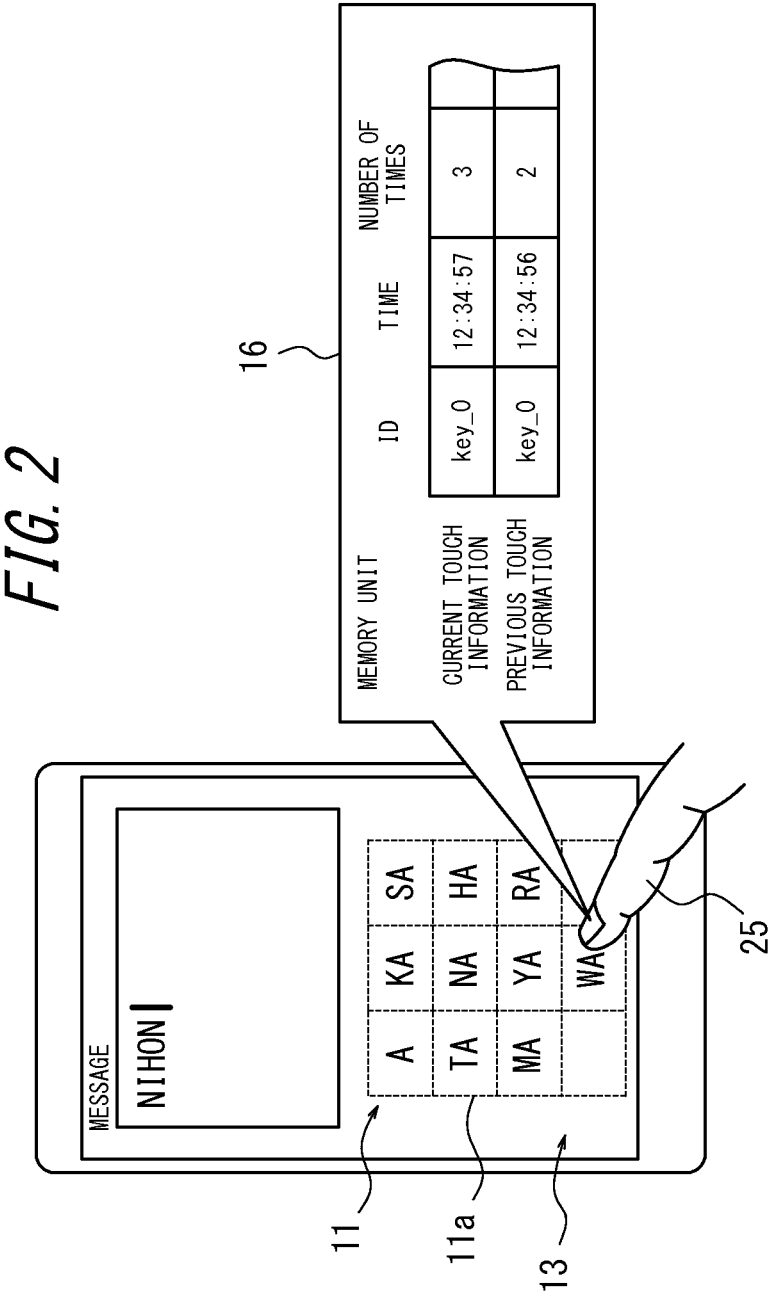
FIG. 2 is a diagram illustrating an example of a character input by the tactile sensation providing apparatus illustrated in FIG. 1.

FIG. 2 is a diagram illustrating an example of the character input by the tactile sensation providing apparatus illustrated in FIG. 1 and the touch information stored in the memory unit 16 at that time. In this example, "Nihon" is input by the Japanese "Kana" input by the multi-tap method. In this case, first, on a touch face 11a of the touch sensor 11, the touch object (finger in FIG. 2) touches a position corresponding to a key of a "Na" row displayed on the display unit 13 two times, a position corresponding to a key of a "Ha" row 5 times and then a position corresponding to a key of a "Wa" row three times.

The tactile sensation providing apparatus according to the present embodiment controls the operation of the tactile sensation providing unit 12 such that, to the touch object 25 touching the touch face 11a of the touch sensor 11, each of the first tactile sensation and the second tactile sensation is provided once in input of a character "Ni", the first tactile sensation is provided once and the second tactile sensation four times in input of a character "ho" and the first tactile sensation is provided once and the second tactile sensation is provided two times in input of a character "n". In this case, accordingly, the first tactile sensation is provided three times and the second tactile sensation is provided seven times, in total, to the touch object 25.

Here, both of the first tactile sensation and the second tactile sensation may be in any vibration pattern. Also, the second tactile sensation is provided by driving the tactile sensation providing unit 12 with lower power than that for providing the first tactile sensation and different from the first tactile sensation. With some driving patterns, accordingly, the operator may feel the second tactile sensation weaker and shorter, or stronger and longer, than the first tactile sensation.

As described above, when the same object is touched, the tactile sensation providing unit 12 is driven by normal power for the first touch (including the touch to display the first character after one cycle) and by low power for the following successive touches. Accordingly, the tactile sensation may be sufficiently provided to the touch object 25 and power consumption may be efficiently reduced.

Also, the memory unit 16, when the key of the "Wa" row is touched three times, stores an identification number (ID) of the touched key (object), which is "key_0" in FIG. 2, the touching time and the number of touches "3" as current touch information, and the ID of the touched key "key_0", the touching time, and the number of touches "2" as previous touch information.

Figure 3:
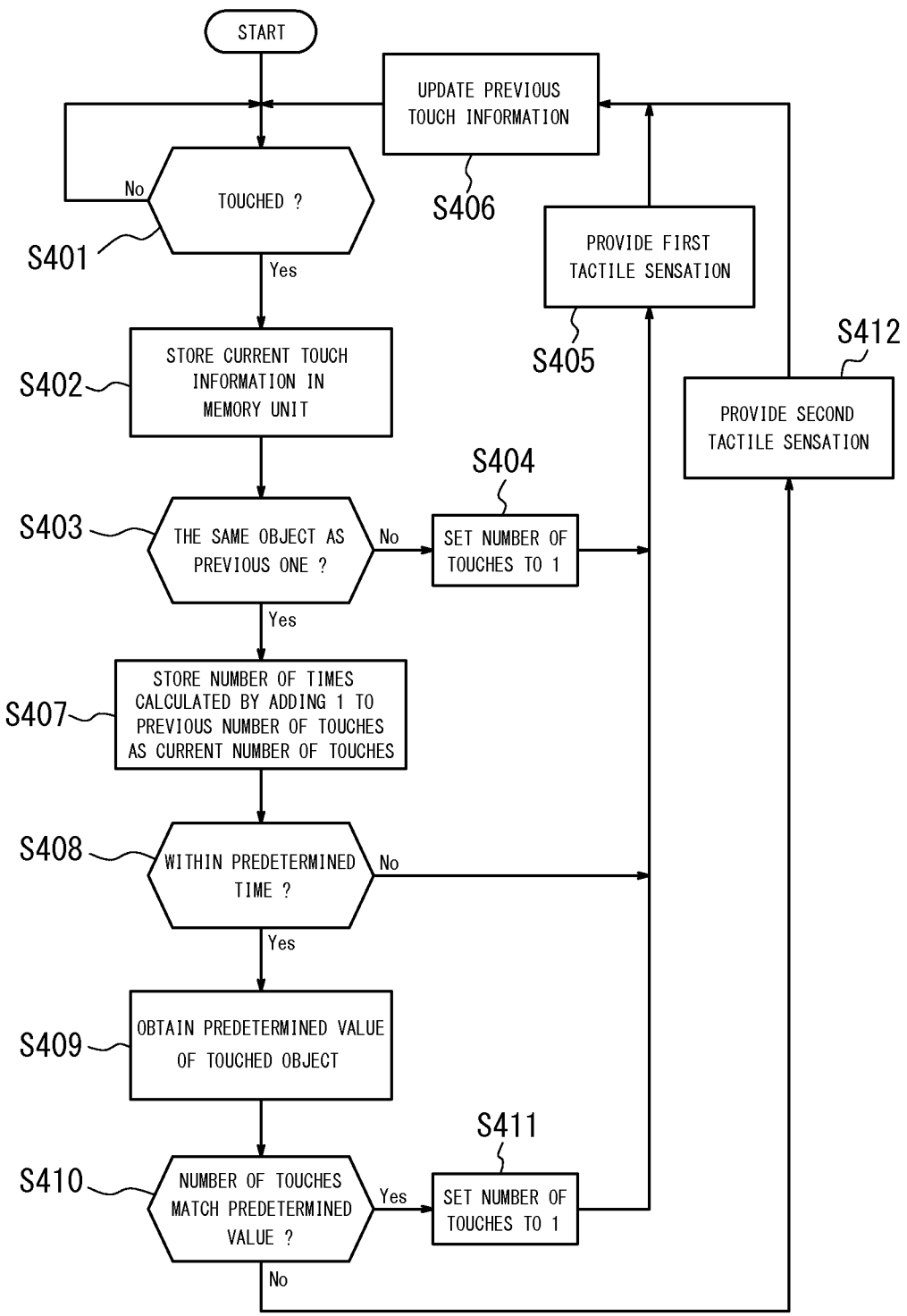
FIG. 3 is a flowchart illustrating an operation of the tactile sensation providing apparatus illustrated in FIG. 1.

The following is a description of the operation of the tactile sensation providing apparatus according to the present embodiment, with reference to a flowchart illustrated in FIG. 3.

The tactile sensation control unit 15, when detecting a touch (touch operation) to the touch sensor 11 based on the touch position information from the touch sensor 11 (S401), stores the current touch information in the memory unit 16 (S402). Then, the tactile sensation control unit 15 determines whether the object touched this time (for example, the identification number (ID) illustrated in FIG. 2) matches a previously touched object stored in the memory unit 16 (S403).

When determining that the objects are different from each other as a result (No), the tactile sensation control unit 15 sets the number of current touches to "1" (S404) and instructs the tactile sensation providing unit 12 to provide the first tactile sensation (S405). Then, the tactile sensation control unit 15 updates the previous touch information by overwriting the previous touch information with the current touch information in the memory unit 16 (S406) and waits for a next touch operation. That is, when an object different from the previously touched object is touched, the tactile sensation control unit 15 determines that a new input of a character assigned to the different object is performed and operates accordingly.

On the other hand, when it is determined at S403 that the object touched this time is the same as the previously touched object stored in the memory unit 16 (Yes), the tactile sensation control unit 15 stores, as the number of current touches, the number obtained by adding 1 to the number of previous touches in the memory unit 16 (S407). Then, the tactile sensation control unit 15 determines whether the current touch is occurred within a predetermined time after the previous touch (S408).

When determining that the predetermined time has passed as a result (No), the tactile sensation control unit 15 instructs the tactile sensation providing unit 12 to provide the first tactile sensation at S405. The tactile sensation control unit 15, further, overwrites the previous touch information with the current touch information in the memory unit 16 at S406 and waits for a next touch. That is, when the predetermined time has passed at the current touch after the previous touch, even when the same object is touched, the tactile sensation control unit 15 determines that a new input to the character assigned to the object is performed and operates accordingly.

The time is used in determination at S408 because, when the predetermined time has not passed, it is considered that an operation to change a displayed character by successive touches, such as to display the character "Ni" by successively touching the key of the "Na" row, is performed as illustrated in FIG. 2 and, when the predetermined time has passed, it is considered that an operation to the same object is performed after a previous operation is finished.

When determining at S408 that the predetermined time has not passed at the current touch after the previous touch (Yes), the tactile sensation control unit 15 retrieves the object information of the touched object from the memory unit 16 and obtains the predetermined value for providing the first tactile sensation (S409). Then, the tactile sensation control unit 15 determines whether the number of touches matches the predetermined value (S410).

When determining that the number of touches matches the predetermined value as a result (Yes), the tactile sensation control unit 15 determines the number of touches as "1" (S411) and instructs the tactile sensation providing unit 12 to provide the first tactile sensation at S405. The tactile sensation control unit 15, further, overwrites the previous touch information with the current touch information in the memory unit 16 at S406 and waits for a next touch. That is, the tactile sensation control unit 15 determines the first character comes back as any of the characters assigned to the object is not selected, and operates accordingly.

Since the tactile sensation control unit 15 instructs to provide the first tactile sensation when the first character comes back as described above, the operator may know, without viewing the display unit 13, that the first character comes back after a cycle of the characters through the tactile sensation.

On the other hand, when determining at S410 that the number of touches does not match the predetermined value (No), the tactile sensation control unit 15 instructs the tactile sensation providing unit 12 to provide the second tactile sensation (S412). Then, the tactile sensation control unit 15 overwrites the previous touch information with the current touch information in the memory unit 16 at S406 and waits for a next touch. That is, the tactile sensation control unit 15 determines that one of the characters assigned to the object, other than the first character, is being selected, and proceeds with the operation.

Figure 4:
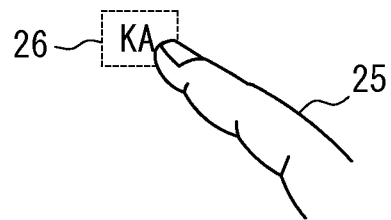
FIG. 4 is a diagram illustrating modes to provide tactile sensations in response to touches to an object of a "Ka" row by the tactile sensation providing apparatus illustrated in FIG. 1.
Figure 5:
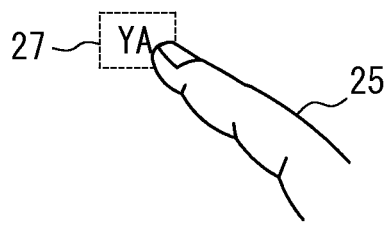
FIG. 5 is a diagram illustrating modes to provide the tactile sensations in response to touches to an object of a "Ya" row by the tactile sensation providing apparatus illustrated in FIG. 1.

FIG. 4 and FIG. 5 are diagrams illustrating modes to provide the tactile sensations by the tactile sensation providing apparatus according to the present embodiment. In FIG. 4 and FIG. 5, a tactile sensation I and a tactile sensation II represent the first tactile sensation and the second tactile sensation, respectively. FIG. 4 illustrates the modes to provide the tactile sensations when the touch object 25 touches a key (object) 26 of a "Ka" row. In this case, there are five characters, "Ka", "Ki", "Ku", "Ke" and "Ko", which may be input by the touch. Accordingly, the first tactile sensation I is provided when the character "Ka" is selected by the first touch, as well as when the character "Ka" is re-selected thereafter by the sixth touch. By touches at other numbers, the second tactile sensation II, which may be substantialized by lower power than that for the first tactile sensation I, is provided.

FIG. 5 illustrates the modes to provide the tactile sensations when the touch object 25 touches a key (object) 27 of a "Ya" row. In this case, there are six characters, "Ya", "Yu", "Yo", "ya", "yu" and "yo", which may be input by the touch, that is, there is one more character than the "Ka" row. Accordingly, the first tactile sensation I is provided when the character "Ya" is selected by the first touch, as well as when the character "Ya" is re-selected by the seventh touch. By touches at other numbers, the second tactile sensation II, which may be substantialized by lower power than that for the first tactile sensation I, is provided.

Next, an English language input will be described.

Figure 10:
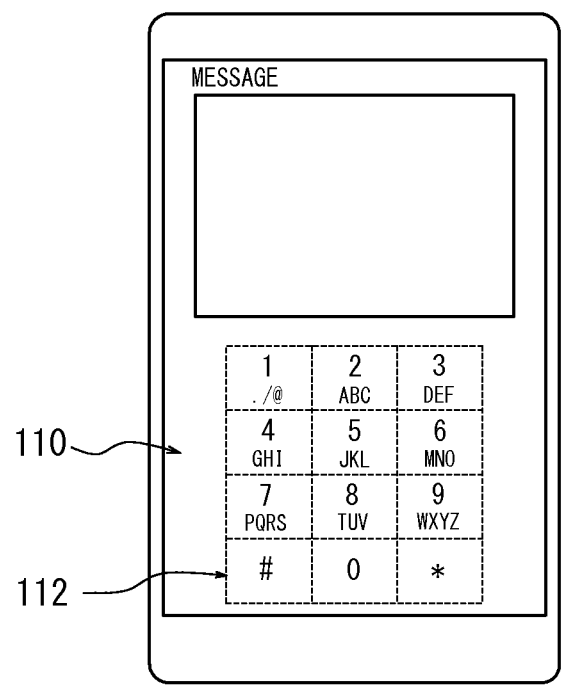
FIG. 10 is a diagram illustrating an example of an operation image for the English language input.

For the English language input, the operation image 112 illustrated in FIG. 10 is displayed based on English language input application. In the operation image 112 in FIG. 10, the alphabets "ABC", "DEF", "GHI" and "JKL" are assigned to a "2" key, a "3" key, a "4" key and a "5" key, respectively. Also, the alphabets "MNO", "PQRS", "TUV" and "WXYZ" are assigned to a "6" key, a "7" key, an "8" key and a "9" key, respectively. Every time an input to each of the keys by pushing or pressing is received, uppercase alphabets, lowercase alphabets and a number are displayed in order. For example, every time an input to the "5" key is received, the alphabets "J", "K", "L", "j", "k", "l", and a number "5" are displayed in order.

FIG. 1 is a functional block diagram illustrating a configuration of the main part of the tactile sensation providing apparatus according to one embodiment of the present invention. The tactile sensation providing apparatus includes the touch sensor 11, the tactile sensation providing unit 12, the display unit 13, the display image generation unit 14, the tactile sensation control unit 15 and the memory unit 16. The touch sensor 11 receives the touch input to the display unit 13 by the touch object such as the finger and the like and is constituted by using, for example, the touch panel or the touch switch of the known type such as the resistive film type, the capacitive type, the optical type and the like. The touch position information of the touch object such as the finger or the stylus pen detected by the touch sensor 11 is supplied to the tactile sensation control unit 15. Note that the touch operation by the touch object includes, depending on the type of the touch sensor, pushing or pressing the touch object against the touch sensor.

The tactile sensation providing unit 12 vibrates the touch face of the touch sensor 11 under control of the tactile sensation control unit 15 and is constituted by using the known vibration means such as, for example, the piezoelectric element and the eccentric motor. For example, the tactile sensation providing unit 12 may have the configuration disclosed in Japanese Patent Laid-Open No. 2010-146507 by the present applicant.

The display unit 13 is constituted by using, for example, the liquid crystal display panel, the organic EL display panel or the like. The display image generation unit 14 generates the display image information including the operation image information having a plurality of objects based on application and OS (Operating System). The display image information is supplied to the display unit 13 such that the display unit 13 displays the display image including the operation image having a plurality of objects of input keys such as, for example, the push-button switches (push-type button switches). The operation image information is supplied to the tactile sensation control unit 15.

The tactile sensation control unit 15 controls the tactile sensation providing unit 12 and includes the object determination unit 21 and the timing unit 22. The object determination unit 21, based on the touch position information from the touch sensor 11 and the operation image information from the display image generation unit 14, determines the touched object. The timing unit 22 times when the object is touched. The object (ID number) determined by the object determination unit 21 and the touching time timed by the timing unit 22 are stored in the memory unit 16 as the touch information. The tactile sensation control unit 15 may be constituted by using software executed by any suitable processor such as the CPU (Central Processing Unit) or the DSP (Digital Signal Processor).

The memory unit 16 stores the touch information including the touched object, the touching time and the number of successive touches obtained from the tactile sensation control unit 15 and the object information including the predetermined value of the number of successive touches for each of the objects. The memory unit 16 may be constituted by using the internal memory of the tactile sensation control unit 15. Here, the predetermined value of the number of successive touches for each of the objects included in the object information represents, for the character input, for example, the number of touches to display the first character (character that appears first) in the string assigned to the object for the second time, depending on the input mode. For example, for the "2" key (object) in the operation image 112 illustrated in FIG. 10, the first character "A" is displayed by the first touch and then by the eighth touch. In this case, accordingly, a predetermined number "8" is stored.

Then, the tactile sensation control unit 15, based on the touch position information from the touch sensor 11, the operation image information from the display image generation unit 14 and the touch information and the object information stored in the memory unit 16, controls the operation of the tactile sensation providing unit 12.

Figure 6:
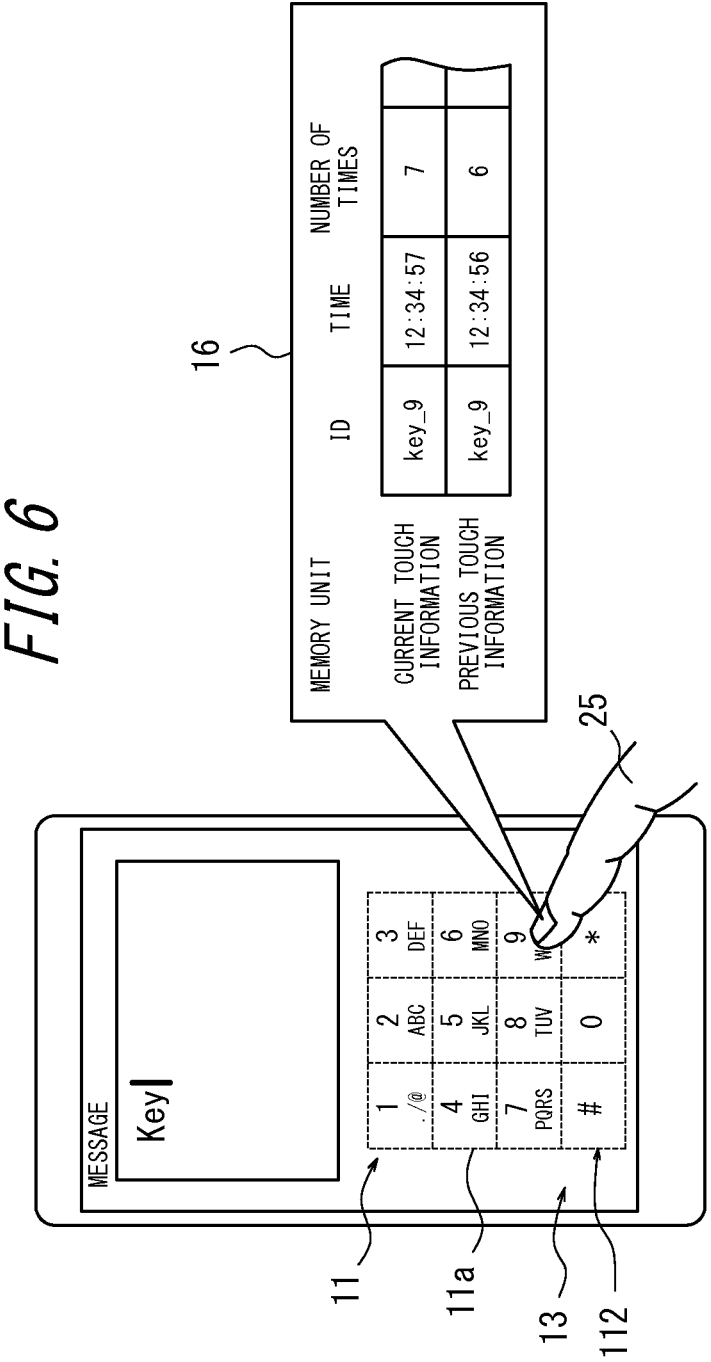
FIG. 6 is a diagram illustrating an example of an English language input by the tactile sensation providing apparatus illustrated in FIG. 1.

FIG. 6 is a diagram illustrating an example of the English language input by the tactile sensation providing apparatus illustrated in FIG. 1 and the touch information stored in the memory unit 16 at that time. In this example, a word "Key" is input. In this case, first, the touch object 25 (the finger in FIG. 6), on the touch face 11a of the touch sensor 11, touches the "5" key displayed on the display unit 12 two times, the "3" key five times and then the "9" key seven times.

The tactile sensation providing apparatus according to the present embodiment controls the operation of the tactile sensation providing unit 12 such that, to the touch object 25 touching the touch face 11a of the touch sensor 11, each of the first tactile sensation and the second tactile sensation is provided once in input of "K", the first tactile sensation is provided once and the second tactile sensation is provided four times in input of "e", and the first tactile sensation is provided once and the second tactile sensation is provided six times in input of "y". In this case, accordingly, the first tactile sensation is provided three times and the second tactile sensation is provided eleven times, in total, to the touch object 25.

Here, both of the first tactile sensation and the second tactile sensation may be in any vibration pattern. Also, the second tactile sensation is provided by driving the tactile sensation providing unit 12 with lower power than that for providing the first tactile sensation and different from the first tactile sensation. With some driving patterns, accordingly, the operator may feel the second tactile sensation weaker and shorter, or stronger and longer, than the first tactile sensation.

As described above, when the same object is touched, the tactile sensation providing unit 12 is driven by normal power for the first touch (including the touch to display the first character after one cycle) and by low power for the following successive touches. Accordingly, the tactile sensation may be sufficiently provided to the touch object 25 and power consumption may be efficiently reduced.

Also, the memory unit 16, when the "9" key is touched seven times, stores the identification number (ID) of the touched key (object), which is "key_9" in FIG. 6, the touching time and the number of touches "7" as the current touch information, and the ID of the touched key "key_9", the touching time and the number of touches "6" as the previous touch information.

The following is a description of the operation of the tactile sensation providing apparatus according to the present embodiment, with reference to the flowchart illustrated in FIG. 3.

The tactile sensation control unit 15, when detecting the touch (touch operation) to the touch sensor 11 based on the touch position information from the touch sensor 11 (S401), stores the current touch information in the memory unit 16 (S402). Then, the tactile sensation control unit 15 determines whether the object touched this time (for example, the identification number (ID) illustrated in FIG. 6) and the previously touched object stored in the memory unit 16 (S403).

When determining that the objects are different from each other as a result (No), the tactile sensation control unit 15 sets the number of current touches to "1" (S404) and instructs the tactile sensation providing unit 12 to provide the first tactile sensation (S405). Then, the tactile sensation control unit 15 updates the previous touch information by overwriting the previous touch information with the current touch information in the memory unit 16 (S406) and waits for a next touch operation. That is, when an object different from the previously touched object is touched, the tactile sensation control unit 15 determines that a new input of a character assigned to the different object is performed and operates accordingly.

On the other hand, when it is determined at S403 that the object touched this time is the same as the previously touched object stored in the memory unit 16 (Yes), the tactile sensation control unit 15 stores, as the number of current touches, the number obtained by adding 1 to the number of previous touches in the memory unit 16 (S407). Then, the tactile sensation control unit 15 determines whether the current touch is occurred within the predetermined time after the previous touch (S408).

When determining that the predetermined time has passed as a result (No), the tactile sensation control unit 15 instructs the tactile sensation providing unit 12 to provide the first tactile sensation at S405. The tactile sensation control unit 15, further, overwrites the previous touch information with the current touch information in the memory unit 16 at S406 and waits for a next touch. That is, when the predetermined time has passed at the current touch after the previous touch, even when the same object is touched, the tactile sensation control unit 15 determines that a new input to the character assigned to the object is performed and operates accordingly.

The time is used in determination at S408 because, when the predetermined time has not passed, it is considered that an operation to change a displayed character by successive touches, such as to display the character "K" by successively touching the "5" key, is performed as illustrated in FIG. 6 and, when the predetermined time has passed, it is considered that an operation to the same object is performed after a previous input is finished.

When determining at S408 that the predetermined time has not passed at the current touch after the previous touch (Yes), the tactile sensation control unit 15 retrieves the object information of the touched object from the memory unit 16 and obtains the predetermined value for providing the first tactile sensation (S409). Then, the tactile sensation control unit 15 determines whether the number of touches matches the predetermined value (S410).

When determining that the number of touches matches the predetermined value as a result (Yes), the tactile sensation control unit 15 determines the number of touches as "1" (S411) and instructs the tactile sensation providing unit 12 to provide the first tactile sensation at S405. The tactile sensation control unit 15, further, overwrites the previous touch information with the current touch information in the memory unit 16 at S406 and waits for a next touch. That is, the tactile sensation control unit 15 determines that the first character comes back as any of the characters assigned to the object is not selected, and proceeds with the operation.

Since the tactile sensation control unit 15 instructs to provide the first tactile sensation when the first character comes back as described above, the operator may know, without viewing the display unit 13, that the first character comes back after the cycle of the characters through the tactile sensation.

On the other hand, when determining at S410 that the number of touches does not match the predetermined value (No), the tactile sensation control unit 15 instructs the tactile sensation providing unit 12 to provide the second tactile sensation (S412). Then, the tactile sensation control unit 15 overwrites the previous touch information with the current touch information in the memory unit 16 at S406 and waits for a next touch. That is, the tactile sensation control unit 15 determines that one of the characters assigned to the object, other than the first character, is being selected and proceeds with the operation.

Figure 7:
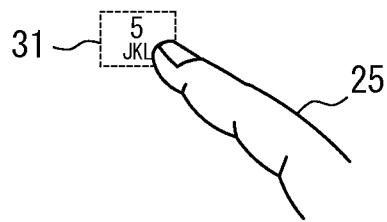
FIG. 7 is a diagram illustrating modes to provide the tactile sensations in response to touches to an object of a "5" key in English language input by the tactile sensation providing apparatus illustrated in FIG. 1.
Figure 8:
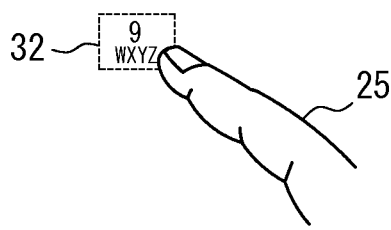
FIG. 8 is a diagram illustrating modes to provide the tactile sensations in response to touches to an object of a "9" key in English language input by the tactile sensation providing apparatus illustrated in FIG. 1.

FIG. 7 and FIG. 8 are diagrams illustrating modes to provide the tactile sensations by the tactile sensation providing apparatus according to the present embodiment. In FIG. 7 and FIG. 8, the tactile sensation I and the tactile sensation II represent the first tactile sensation and the second tactile sensation, respectively. FIG. 7 illustrates the modes to provide the tactile sensations when the touch object 25 touches the "5" key (an object 31). In this case, there are seven characters, "J", "K", "L", "j", "k", "l" and "5", which may be input by the touch. Accordingly, the first tactile sensation I is provided when the character "J" is selected by the first touch, as well as when the character "J" is re-selected by the eighth touch. By touches at other numbers, the second tactile sensation II, which may be substantialized by lower power than that for the first tactile sensation I, is provided.

FIG. 8 illustrates the modes to provide the tactile sensations when the touch object 25 touches the "9" key (an object 32). In this case, there are nine characters, "W", "X", "Y", "Z", "w", "x", "y", "z" and "9", which may be input by the touch, that is, there are two more characters than the "5" key. Accordingly, the first tactile sensation I is provided when the character "W" is selected by the first touch, as well as when the character "W" is re-selected by the tenth touch. By touches at other numbers, the second tactile sensation II, which may be substantialized by lower power than that for the first tactile sensation I, is provided.

According to the tactile sensation providing apparatus of the present embodiment, as the tactile sensation to be provided at an input, the first tactile sensation and the second tactile sensation, which may be substantialized by lower power than that for the first tactile sensation, are selectively provided. Accordingly, in comparison to a mode providing the first tactile sensation every time, power consumption may be efficiently reduced. Therefore, when the tactile sensation providing apparatus is applied to the mobile terminals using batteries as power source, a battery life may be improved. Further, since the first tactile sensation and the second tactile sensation are provided based on a change of the touched object, the number of touches and a time between touches, the operator may recognize information about the touch based on the tactile sensation provided. Accordingly, the operability may be further improved.

It is to be understood that the present invention is not limited to the embodiment set forth above but may be varied or changed in a multiple of manners within the spirit of the present invention.

REFERENCE SIGNS LIST

11 touch sensor
11a touch face
12 tactile sensation providing unit
13 display unit
14 display image generation unit
15 tactile sensation control unit
16 memory unit
21 object determination unit
22 timing unit
25 touch object
26, 27, 31, 32 key (object)

The invention claimed is:

1. A tactile sensation providing apparatus comprising:
 a display image generation unit configured to generate display image information having operation image information having a plurality of objects;
 a display unit configured to display a display image by inputting the display image information;
 a touch sensor disposed on the display unit and configured to detect a touch position and to output touch position information;
 a tactile sensation providing unit configured to vibrate a touch face of the touch sensor;
 a memory unit configured to store information about the objects; and
 a tactile sensation control unit configured to control provision of a tactile sensation by the tactile sensation providing unit, wherein
 the tactile sensation control unit determines the object based on the operation image information and the touch position information and stores touch information indicating a circumstance of generation of the touch position information including the information about the object,
 when an object in current touch information to be newly stored in the memory unit does not match an object in previous touch information stored in the memory unit before the current touch information, the tactile sensation control unit controls the tactile sensation providing unit such that a first tactile sensation is provided to a touch object touching the touch face, and
 when the object in the current touch information matches the object in the previous touch information, the tactile sensation control unit controls the tactile sensation providing unit such that the first tactile sensation or a second tactile sensation, provided with power lower than power for providing the first tactile sensation, is provided to the touch object.

2. The tactile sensation providing apparatus according to claim 1, wherein
 the tactile sensation control unit measures a touching time to input the touch position information, includes the touching time in the touch information and stores the touch information in the memory unit, and
 when the object in the current touch information matches the object in the previous touch information and a predetermined time has passed at the touching time in the current touch after the touching time in the previous touch information, the tactile sensation control unit controls the tactile sensation providing unit such that the first tactile sensation is provided to the touch object.

3. The tactile sensation providing apparatus according to claim 1, wherein
 the memory unit further stores a predetermined value of the number of sequential touches for each of the plurality of objects,
 the tactile sensation control unit counts the number of sequential touches when the object in the current touch information matches the object in the previous touch information, includes the counted number in the touch information and stores the touch information in the memory unit, and
 when the object in the current touch information matches the object in the previous touch information and the counted number of the sequential touches in the current touch information matches the predetermined value of a corresponding object stored in the memory unit, the tactile sensation control unit controls the tactile sensation providing unit such that the first tactile sensation is provided to the touch object.

* * * * *